(12) United States Patent
Gu et al.

(10) Patent No.: US 11,605,086 B2
(45) Date of Patent: Mar. 14, 2023

(54) ELECTRONIC DATABASE SEARCH AND STORAGE EFFICIENCY IMPROVEMENT

(71) Applicant: PayPal, Inc., San Jose, CA (US)

(72) Inventors: Jun Gu, Shanghai (CN); Yunjing Dai, Shanghai (CN); Jie Huang, Shanghai (CN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/908,373

(22) PCT Filed: Oct. 30, 2019

(86) PCT No.: PCT/CN2019/114323
§ 371 (c)(1),
(2) Date: Jun. 22, 2020

(87) PCT Pub. No.: WO2021/081802
PCT Pub. Date: May 6, 2021

(65) Prior Publication Data
US 2021/0158358 A1    May 27, 2021

(51) Int. Cl.
*G06F 16/90* (2019.01)
*G06Q 20/40* (2012.01)
(Continued)

(52) U.S. Cl.
CPC ....... *G06Q 20/4016* (2013.01); *G06F 16/906* (2019.01); *G06F 16/9024* (2019.01); *G06F 16/90335* (2019.01)

(58) Field of Classification Search
CPC .............. G06Q 20/4016; G06Q 20/405; G06Q 30/018; G06Q 30/0609; G06Q 40/02; G06F 16/9024; G06F 16/90335; G06F 16/906
See application file for complete search history.

(56) References Cited

U.S. PATENT DOCUMENTS

2015/0242479 A1   8/2015  Cheenath et al.
2016/0321661 A1*  11/2016  Hammond ............. G06Q 20/20
(Continued)

FOREIGN PATENT DOCUMENTS

CN   106327340 A   1/2017
CN   106503992 A   3/2017
(Continued)

OTHER PUBLICATIONS

National Intellectual Property Administration, PRC (ISA/CN), Notification of Transmittal of the International Search Report and the Written Opinion of the International Searching Authority, or the Declaration dated 27 Jul. 27, 2020, International Application No. PCT/CN2019/114323, 9 pages, Beijing.

*Primary Examiner* — Etienne P Leroux
*Assistant Examiner* — Cindy Nguyen
(74) *Attorney, Agent, or Firm* — Haynes and Boone, LLP

(57) ABSTRACT

Account information for a plurality of accounts and transaction information for a plurality of transactions conducted among the plurality of accounts are analyzed. A transaction volume threshold is determined based on the analysis. A first subset of the accounts is identified. The first subset of account each corresponds to an amount of conducted transactions below the transaction volume threshold. A second subset of the accounts is identified. The second subset of the accounts each corresponds to an amount of conducted transactions above the transaction volume threshold. In response to the identification of the first subset and the second subset of the accounts, the account information and the transaction information are stored into an electronic database collectively for the first subset of the accounts, and the account information and the transaction information are stored into the electronic database separately for the second subset of the accounts.

20 Claims, 10 Drawing Sheets

(51) Int. Cl.
    *G06F 16/906*     (2019.01)
    *G06F 16/903*     (2019.01)
    *G06F 16/901*     (2019.01)

(56) References Cited

U.S. PATENT DOCUMENTS

2018/0122002 A1    5/2018    Kelly
2020/0167786 A1*    5/2020    Kursun .................. H04L 63/08

FOREIGN PATENT DOCUMENTS

CN    108460598 A    8/2018
EP    2202658 A2    6/2010

* cited by examiner

| DEGREE CATEGORY $D_i$ | VERTEX COUNT | VERTEX PERCENTAGE $P_i$ | EXTRA AVERAGE LATENCY $g(t)$ | EXTRA AVERAGE STORAGE $f(t)$ |
|---|---|---|---|---|
| 0 | 0 | 0% | 1 | 0 |
| (0,5) | 762420204 | 71% | 0.290658248 | 0.02538551 |
| (5,10) | 99984611 | 9% | 0.197634402 | 0.03204367 |
| (10,20) | 60011479 | 6% | 0.141800825 | 0.04003623 |
| (20,30) | 26726772 | 2% | 0.116934727 | 0.04537559 |
| (30,40) | 17353415 | 2% | 0.100789428 | 0.04999798 |
| (40,50) | 12742226 | 1% | 0.088934295 | 0.05424063 |
| (50,100) | 37187103 | 3% | 0.054336098 | 0.07900423 |
| (100,1000) | 560042879 | 5% | 0.002194833 | 0.45220445 |
| (1000,10000) | 2187808 | 0% | 0.000159336 | 0.59789476 |
| (10000,100000) | 154785 | 0% | 1.53271E-05 | 0.70096904 |
| (100000,1000000) | 14945 | 0% | 1.42255E-06 | 0.80049065 |
| (1000000,10000000) | 1366 | 0% | 1.51652E-07 | 0.89145519 |
| (10000000, MaxValue) | 163 | 0% | 0 | 1 |

ELECTRONIC DATABASE SEARCH AND STORAGE EFFICIENCY IMPROVEMENT

PRIORITY DATA

The present application claims priority to PCT application No. PCT/CN2019/114323, filed on Oct. 30, 2019, entitled "Electronic Database Search and Storage Efficiency Improvement", the contents of which are hereby incorporated by reference in its entirety.

BACKGROUND

Field of the Invention

The present invention generally relates to electronic databases, and more particularly, to optimizing search and storage efficiency for electronic databases.

Related Art

Rapid advances have been made in the past several decades in the fields of computer technology and telecommunications. As a result, these advances allow more and more transactions to be conducted online. For example, buyers and sellers may engage in electronic transactions with one another using an online marketplace. Information about these transactions may be stored in an electronic database. The electronic database may be used to perform searches to determine risks of fraud or suspicious activities. Unfortunately, existing methods of storing information in electronic databases may be inefficient, and/or the searches using electronic databases may be slow. What is needed is a more optimized system and method to store and search information in an electronic database.

BRIEF DESCRIPTION OF THE FIGURES

FIG. 4 illustrates two different storage schemes according to various aspects of the present disclosure.

FIG. 8 is a table listing the distribution of vertexes and edges according to various aspects of the present disclosure.

Figure 1:
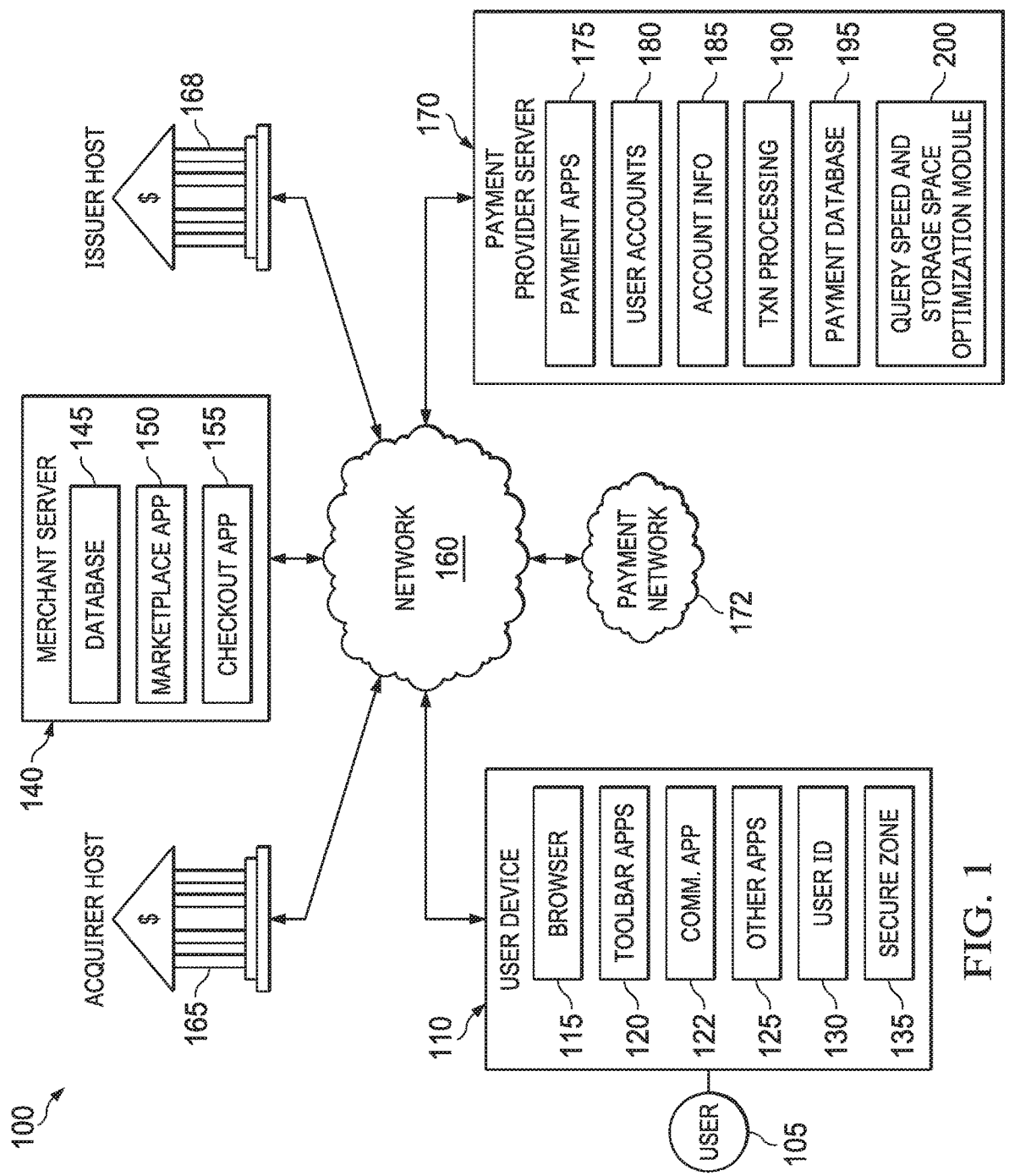
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to systems and methods of optimizing database storage and search efficiency. This is done first by analyzing account information (e.g., also referred to as vertexes) and transaction information (e.g., also referred to as edges) conducted between the accounts. Based on the analysis, the present disclosure determines a threshold for separating high-degree vertexes (e.g., accounts with a high number of transactions) and low-degree vertexes (e.g., accounts with a low number of transactions). For high-degree vertexes, the vertexes and the edges are stored separately. This scheme enhances storage efficiency. For low-degree vertexes, the vertexes and the edges are stored collectively, for example the vertex information is cached in the storage of the edges. This scheme enhances search speed and reduces latency. The various aspects of the present disclosure are discussed in more detail with reference to FIGS. 1-12.

FIG. 1 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the Appstore™ of APPLE™ or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

According to various aspects of the present disclosure, the merchant server 140 may also host a website for an online marketplace, where sellers and buyers may engage in purchasing transactions with each other. The descriptions of the items or products offered for sale by the sellers may be stored in the database 145. For example, the descriptions of the items may be generated (e.g., by the sellers) in the form of text strings. These text strings are then stored by the merchant server 140 in the database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, a query speed and storage space optimization module 200 may also be implemented on the payment provider server 170. The query speed and storage space optimization module 200 may include one or more software applications or software programs that can be automatically executed (e.g., without needing explicit instructions from a human user) to perform certain tasks. For example, the query speed and storage space optimization module 200 may analyze the information regarding user accounts and transactions conducted between the user accounts. Based on the analysis, the query speed and storage space optimization module 200 may calculate a threshold for what should be considered a large account having many transactions, and what should be considered a small account having only not too many transactions. One storage scheme is then used to store information for the large accounts, while a different storage scheme is used to stored information for the small accounts, as discussed in more detail below. It is noted that although the query speed and storage space optimization module 200 is illustrated as being separate from the transaction processing application 190 in the embodiment shown in FIG. 1, the transaction processing application 190 may implement some, or all, of the functionalities of the query speed and storage space optimization module 200 in other embodiments. In other words, the query speed and storage space optimization module 200 may be integrated within the transaction processing application 190 in some embodiments. In addition, it is understood that the query speed and storage space optimization module 200 (or another similar program) may be implemented on the merchant server 140, or even on a portable electronic device similar to the user device 110 as well.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
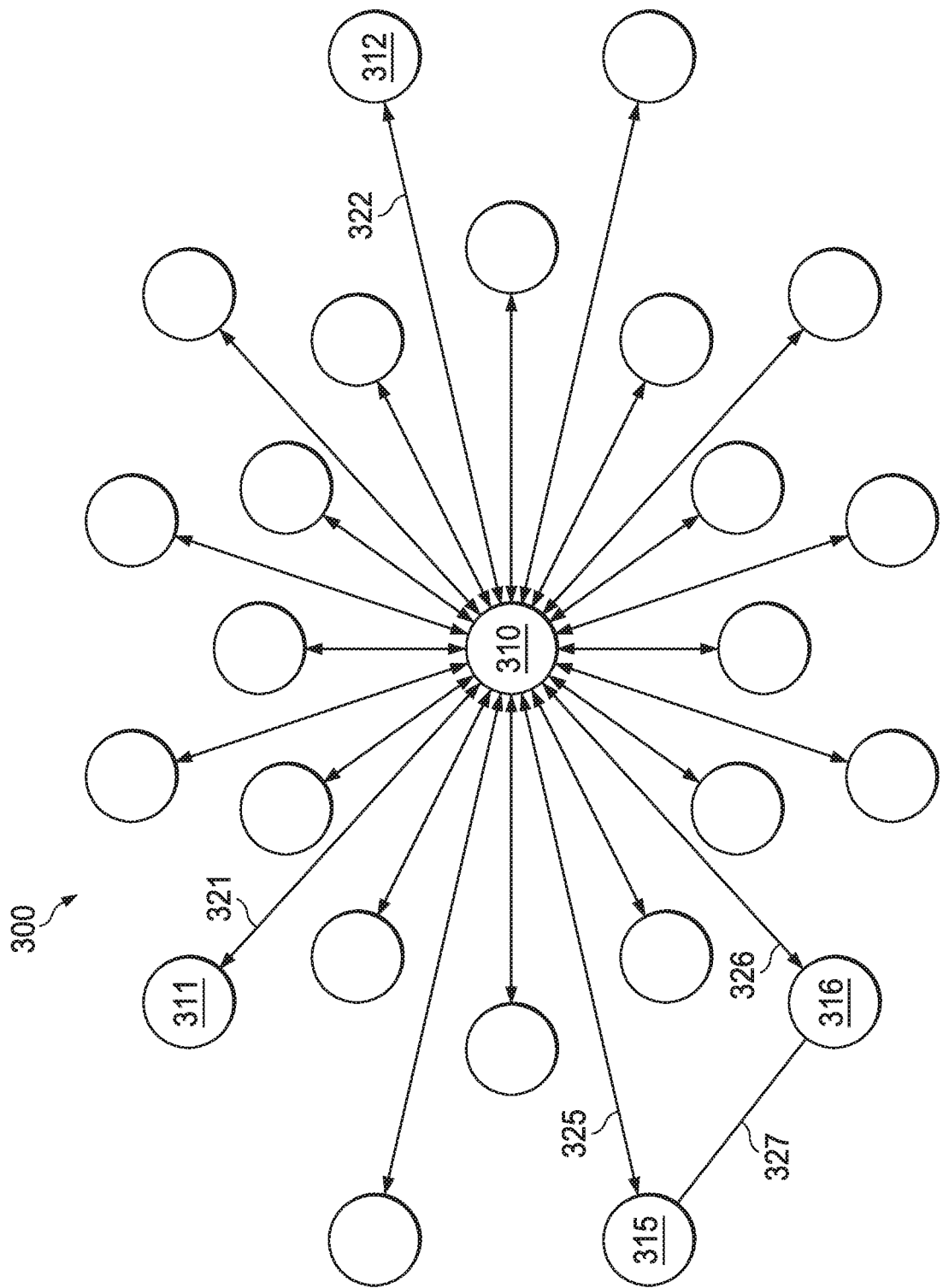
FIGS. 2-3 illustrate example graphs according to various aspects of the present disclosure.

FIG. 2 illustrates a graph 300 that visually represents a plurality of transactions conducted using a transaction platform (e.g., a third party payment provider, such as the payment provider server 170 of FIG. 1) and the parties involved in the transactions. In a non-limiting embodiment, the graph 300 is a payment graph, but it is understood that the graph 300 is not limited to payment graphs but may apply to other types of graphs involving interactions between different parties. In more detail, the graph 300 may include a plurality of vertexes (also referred to as vertices or nodes) that each represents a party involved in a respective transaction. The graph 300 may also include a plurality of edges that interconnect the vertexes together, where the edges each represent a respective transaction. In other words, vertexes may correspond to information regarding the parties themselves, such as username, password, bank account number, etc., whereas the edges may correspond to information regarding the actual transactions, such as the names of the buyer and/or seller, the transaction amount, the transaction time, and/or the items involved in the transaction, etc. For reasons of simplicity, the accounts and the vertexes are interchangeably referred hereinafter, and the transactions and the edges are interchangeably referred hereinafter.

The vertexes and the edges may be stored in an electronic database of the transaction platform. An investigator—which may be a human or a machine—may utilize the graph 300 to investigate potentially suspicious activities. Such investigations may be regularly performed to ensure regulatory or corporate compliance. For example, the investigator may initiate an investigation on a target account, which is represented by a central vertex 310 of the graph 300 herein. All of the transactions involving the target account within a predetermined period of time (e.g., the previous 12 months) are retrieved from the electronic database to construct the graph 300. Since the target account is involved in all of these transactions, the central vertex 310 is interconnected to all of the other vertexes in the graph 300. Some of these other vertexes, such as vertexes 311 and 312, have only conducted transactions (represented by edges 321 and 322, respectively) with the central vertex 310. Some of these other vertexes, such as vertexes 315 and 316, have not only conducted transactions (represented by edges 325 and 326) with the central vertex 310, but also conducted transactions (represented by edge 327) with each other.

In any case, the amount of information stored in the edges may impact the storage efficiency of the electronic database, as well as the speed (e.g., measured by latency) at which the information can be retrieved. These two objectives are often conflicting with each other. For example, if the edges are configured to store the information about the vertexes connected by the edges—meaning that the transaction information record in the database also stores the information about the accounts involved in the transaction—such a technique of storing information may consume extra storage space in the electronic database, which is inefficient and increases cost. On the other hand, if the information stored in an edge is insufficient, for example if it lacks the information regarding the accounts involved in the transaction (e.g., the edge does not store any vertex information), the investigator will then need to run an additional query to retrieve the vertex information. The extra query increases latency and lengthens the handling time of the investigation. Therefore, not storing vertex information in the edges may lead to operational inefficiencies as well.

The inventors of the present disclosure recognize the above problem and have devised a unique solution to solve the problem. First, a threshold is determined. For high-transaction-volume accounts above the threshold, the present disclosure stores the vertex information and the edge information separately. For low-transaction-volume accounts below the threshold, the present disclosure stores the vertex information in the edges. This approach will simultaneously optimize the storage efficiency and the query speed (e.g., lower latency), as discussed in more detail below.

Figures 3, 4A, 4B:
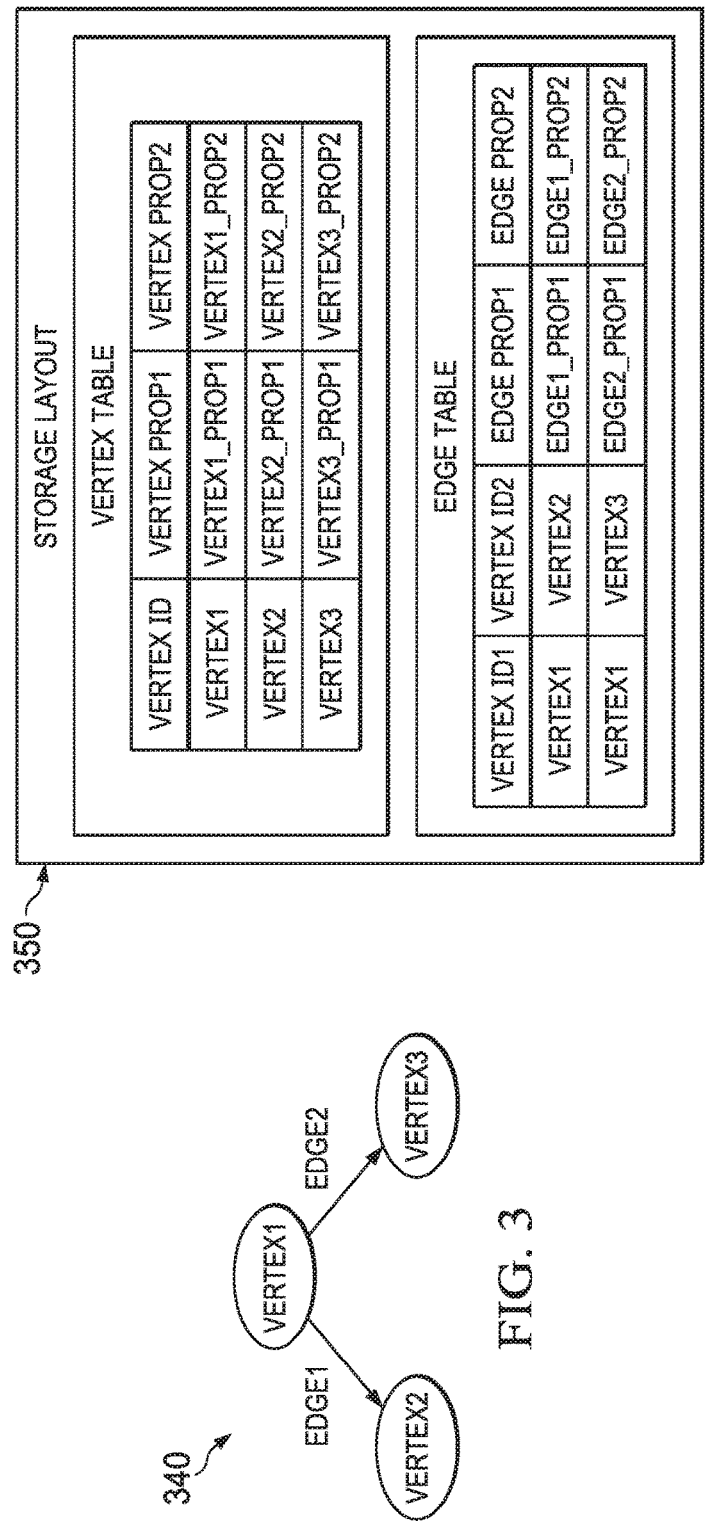

FIG. 3 illustrates a simplified graph 340 that illustrates the transactions for a target account vertex1, and FIGS. 4A-4B illustrate two transaction data storage schemes 350 and 360 that could be used to store the transaction data of the graph 340 according to various aspects of the present disclosure. In more detail, the graph 340 includes a transaction (edge1) conducted between accounts corresponding to vertex1 and vertex2, as well as a transaction (edge2) conducted between accounts corresponding to vertex1 and vertex3.

The storage scheme 350 in FIG. 4A includes two tables: a Vertex Table and an Edge Table. In other words, the Vertex information is stored in the Vertex Table, while the Edge information is separately stored in the Edge Table. Meanwhile, the storage scheme 360 in FIG. 4B includes a single table, which is the Edge Table. The vertex information is stored in the Edge Table, along with the edge information.

The Vertex Table in FIG. 4A includes columns corresponding to "Vertex Id", "Vertex Prop1", and "Vertex Prop2". The entries in the "Vertex Id" column are the identifiers for the vertexes of FIG. 3, which includes "vertex1", "vertex2", and "vertex3" in this simplified example. The vertexes "vertex1", "vertex2", and "vertex3" each correspond to a different account. The entries in the "Vertex Prop1" and "vertex Prop2" columns are different properties of the accounts. As a simplified and non-limiting example, "vertex1_prop1", "vertex2_prop1", and "vertex3_prop1" contain the account password for the three different accounts identified by "vertex1", "vertex2", and "vertex3", respectively, and "vertex1_prop2", "vertex2_prop2", and "vertex3_prop2" contain the payment instrument information (e.g., credit card number or bank account number) for the three different accounts identified by "vertex1", "vertex2", and "vertex3", respectively. It is understood that the Vertex Table may include a plurality of other columns that correspond to different types of properties of the accounts (e.g., an account user's full name, address, citizenship, employer, user preferences, etc.), as well as a plurality of other rows that correspond to additional accounts. For reasons of simplicity, however, these additional columns and rows are not illustrated herein.

The Edge Table in FIG. 4A includes columns corresponding to "Vertex Id1", "Vertex Id2", "Edge Prop1", and "Edge Prop2". The entries in the "Vertex Id1" and "Vertex Id2" columns identify the vertexes that have conducted a transaction with each other. For example, the second row of the Edge Table lists "vertex1" and "vertex2" as the entries for the columns "Vertex Id1" and "Vertex Id2", respectively. This means that the accounts identified by "vertex1" and "vertex2" have conducted a transaction between them. Edge1 is the edge that links these two vertexes "vertex1" and "vertex2" together, meaning that edge1 corresponds to the transaction between "vertex1" and "vertex2". The entries in the "Edge Prop1" and "Edge Prop2" columns identify the properties of the transactions conducted by the accounts corresponding to "Vertex Id1" and "Vertex Id2". For example, the second row of the Edge Table lists "edge1_prop1" and "edge2_prop2" as the entries for the columns "Edge Prop1" and "Edge Prop2". As a simplified and non-limiting example, "edge1_prop1" may contain the monetary amount for the transaction corresponding to the second row (e.g., edge1), and "edge1_prop2" may contain the date on which the transaction was conducted. Similarly, the third row of the Edge Table corresponds to a transaction (edge2) conducted between accounts identified by "vertex1" and "vertex3", and the edge properties "edge2_prop1" and "edge2_prop2" for this transaction are used to store the monetary amount and date of this transaction, respectively.

It is clear that the storage scheme 350 of FIG. 4A calls for separate storage of vertex information and edge information. Since the Edge Table does not need to store the vertex information, the scheme 350 is a more efficient (and less spacing-consuming) way of storing information in the database. However, under the scheme 350, an investigator needs two separate queries to retrieve the needed relevant information. For example, suppose the investigator needs to retrieve the information of the transactions involving vertex1 and all the counterparties involved in the transactions. The investigator may run a first query to obtain all the edges that include vertex1, which are edge1 and edge2 in this simplified example. As such, the first query obtains the edge information stored in the Edge Table of FIG. 4A. Thereafter, the investigator may run a second query to obtain the vertex information for each of the edges (edge1 and edge2). In other words, the second query obtains the vertex information stored in the Vertex Table of FIG. 4A. Because two separate queries are needed for each transaction, the storage scheme 350 of FIG. 4A may have poor latency. Thus, a characteristic of the scheme 350 is that it has good storage efficiency but poor latency.

Compared to the scheme 350, the scheme 360 of FIG. 4B uses a single table (the Edge Table) to store the vertex information and the edge information. Alternatively stated, the vertex information that would have been stored separately under the scheme 350 is now stored along with the edge information under the scheme 360. As such, the Edge Table has columns corresponding to the "Vertex Id1", "Vertex Id2", "Edge Prop1", "Edge Prop2", "Vertex Prop1", and "Vertex Prop2". The type of information (e.g., "vertex 1", "edge1_prop1", "vertex2_prop1") stored in these columns are substantially the same as that discussed above in association with FIG. 4A, and therefore the entries in the Edge Table of FIG. 4B are not described again for reasons of simplicity. Note that each record in the database (e.g., each row of the Edge Table) under the scheme 360 stores not only the edge properties, but also the vertex properties of the vertexes connecting the edge.

Due to the collective storage of the edge properties and the vertex properties, the scheme 360 is not as efficient as the scheme 350 in terms of storage space.

However, the scheme 360 allows an investigator to retrieve all the relevant information using just one query for each transaction. For example, a single query on the transaction corresponding to "edge1" (e.g., the transaction conducted between "vertex1" and "vertex2") will obtain not only the edge properties "edge1_prop1" and "edge1_prop2", but also the vertex properties "vertex2_prop1" and "vertex2_prop2." Similarly, a single query on the transaction corresponding to "edge2" (e.g., the transaction conducted between "vertex1" and "vertex3") will obtain not only the edge properties "edge2_prop1" and "edge2_prop2", but also the vertex properties "vertex3_prop1" and "vertex3_prop2." As such, the scheme 360 has lower latency compared to the scheme 350, since the scheme 360 can obtain all the desired information in just one "hop." Accordingly, a characteristic of the storage scheme 360 of FIG. 4B is that it has faster speed or lower latency (which reduces the handling time of the investigation), but more inefficient (e.g., spacing-consuming) storage.

Rather than using a single type of storage scheme for all accounts (e.g., a one-size-fits-all approach), the inventors of the present disclosure recognize that it may be more suitable for some types of accounts to have information stored using the storage scheme 350, while it may be more suitable for some other types of accounts to have information stored using the storage scheme 360. For example, according to some embodiments of the present disclosure, for big accounts whose transaction volume is above a predetermined threshold, their account information (e.g., vertex information) and transaction information (e.g., edge information) are stored separately using the scheme 350. For small accounts whose transaction volume is below a predetermined threshold, their account information (e.g., vertex information) is cached with the transaction information (e.g., edge information) using the scheme 360.

Figure 5:
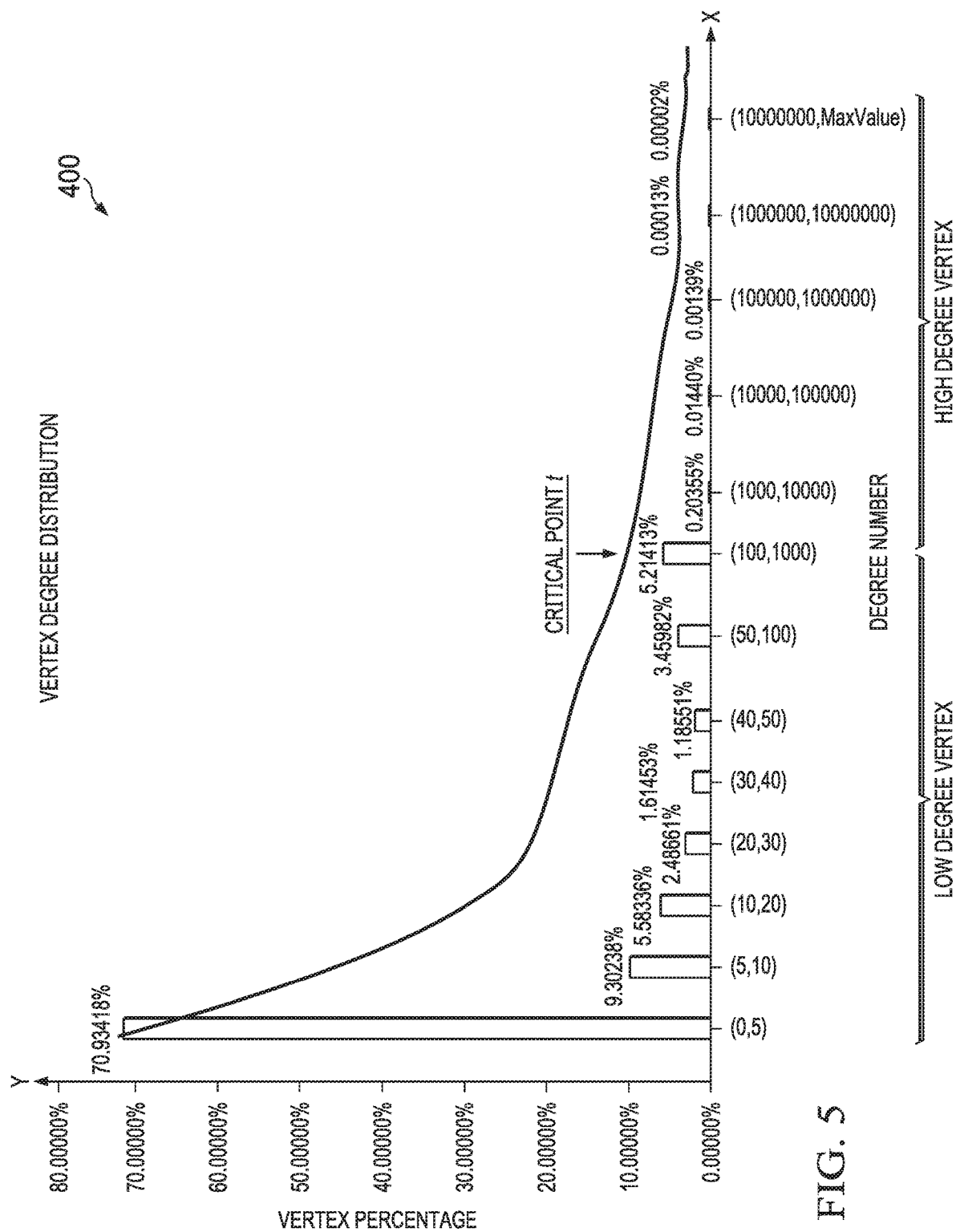
FIGS. 5-7 illustrate various graphs for distributions of accounts according to various aspects of the present disclosure.

FIG. 5 is a graph 400 that visually illustrates the distribution of the sizes of accounts (vertexes) for an example payment platform. The graph 400 includes an X-axis that corresponds to the number of transactions for accounts, as well as a Y-axis that corresponds to a percentage of accounts. Along the X-axis, there are points corresponding to different transaction volumes, for example transaction volumes between 0 and 5, between 5 and 10, between 10 and 20, between 20 and 30, between 30 and 40, between 40 and 50, between 50 and 100, between 100 and 1000, between 1000 and 10000, between 10000 and 100000, between 100000 and 1000000, between 1000000 and 10000000, and between 10000000 and no maximum value (e.g., infinity).

The graph 400 shows various bars corresponding to the different points of transaction volume. The heights of the bars indicate the percentage of the accounts with the corresponding range of transaction volume. In other words, the graph 400 is a histogram. As the bars indicate, 70.93418% of the accounts (vertexes) have transactions between 0 and 5, 9.30238% of the accounts have transactions between 5 and 10, 5.58336% of the accounts have transactions between 10 and 20, 2.48661% of the accounts have transactions between 20 and 30, 1.61453% of the accounts have transactions between 30 and 40, 1.18551% between 40 and 50, 3.54982% of the accounts have transactions between 50 and 100, 5.21413% of the accounts have transactions between 100 and 1000, 0.20355% of the accounts have transactions between 1000 and 10000, 0.0144% of the accounts have transactions between 10000 and 100000, 0.00139% of the accounts have transactions between 100000 and 1000000, 0.00013% of the accounts have transactions between 1000000 and 10000000, and 0.00002% of the accounts have transactions between 10000000 and no maximum value (e.g., infinity).

According to the distribution of the bars of the histogram, the majority of the accounts on the payment platform may be considered small accounts, also referred to as low-degree vertexes. A degree of a vertex may be defined as the number of edges that are incident to the vertex in the graph (e.g., of FIG. 2), or stated differently, the number of transactions (e.g., transaction volume) conducted by an account. Only a small percentage of the accounts on the payment platform may be considered big accounts, also referred to as high-degree vertexes. The demarcation line or threshold separating the low-degree vertexes and the high-degree vertexes is the critical point t, which occurs at the transaction range between 100 and 1000 in the example shown in FIG. 5.

Figure 6:
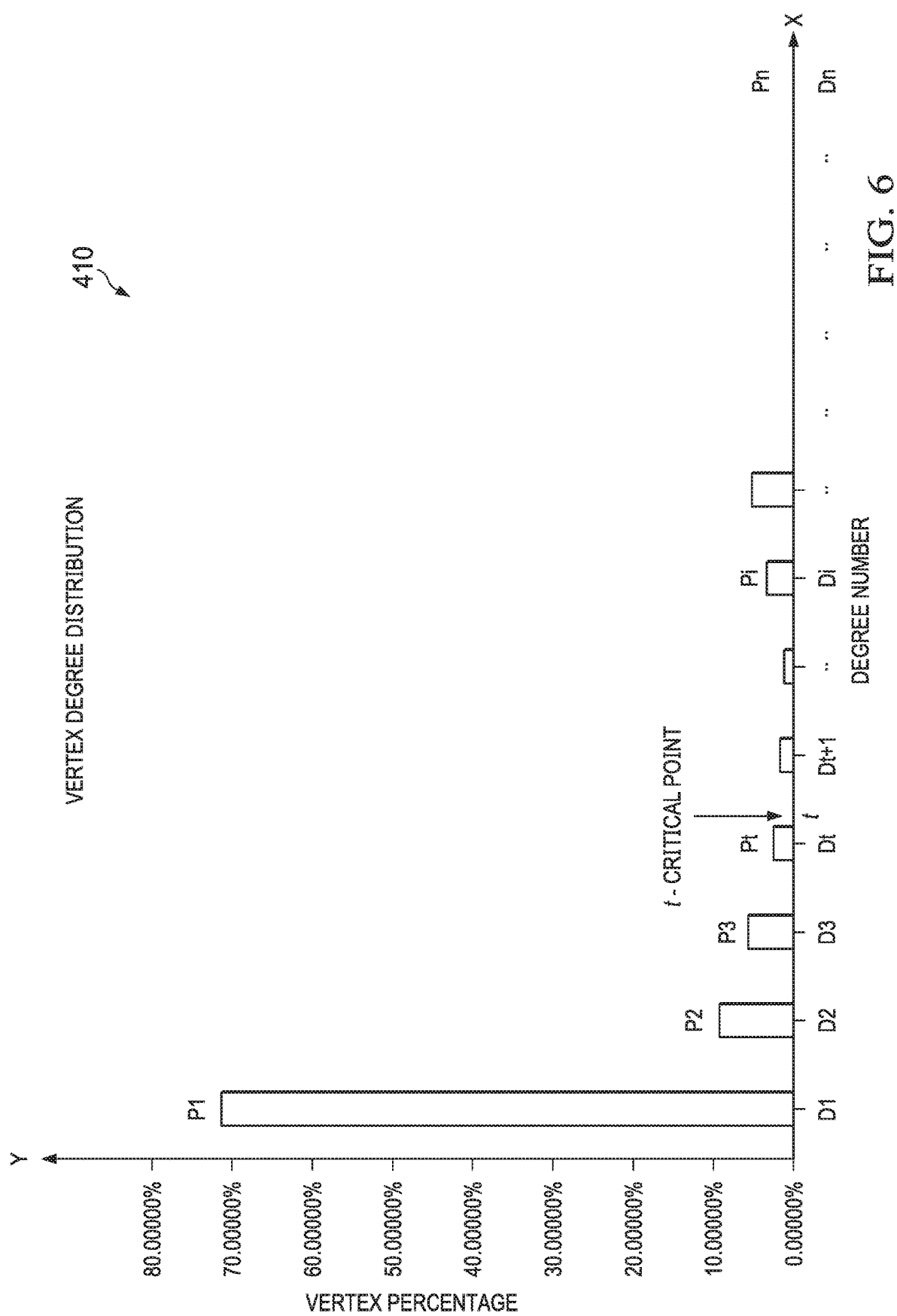
Figure 7:
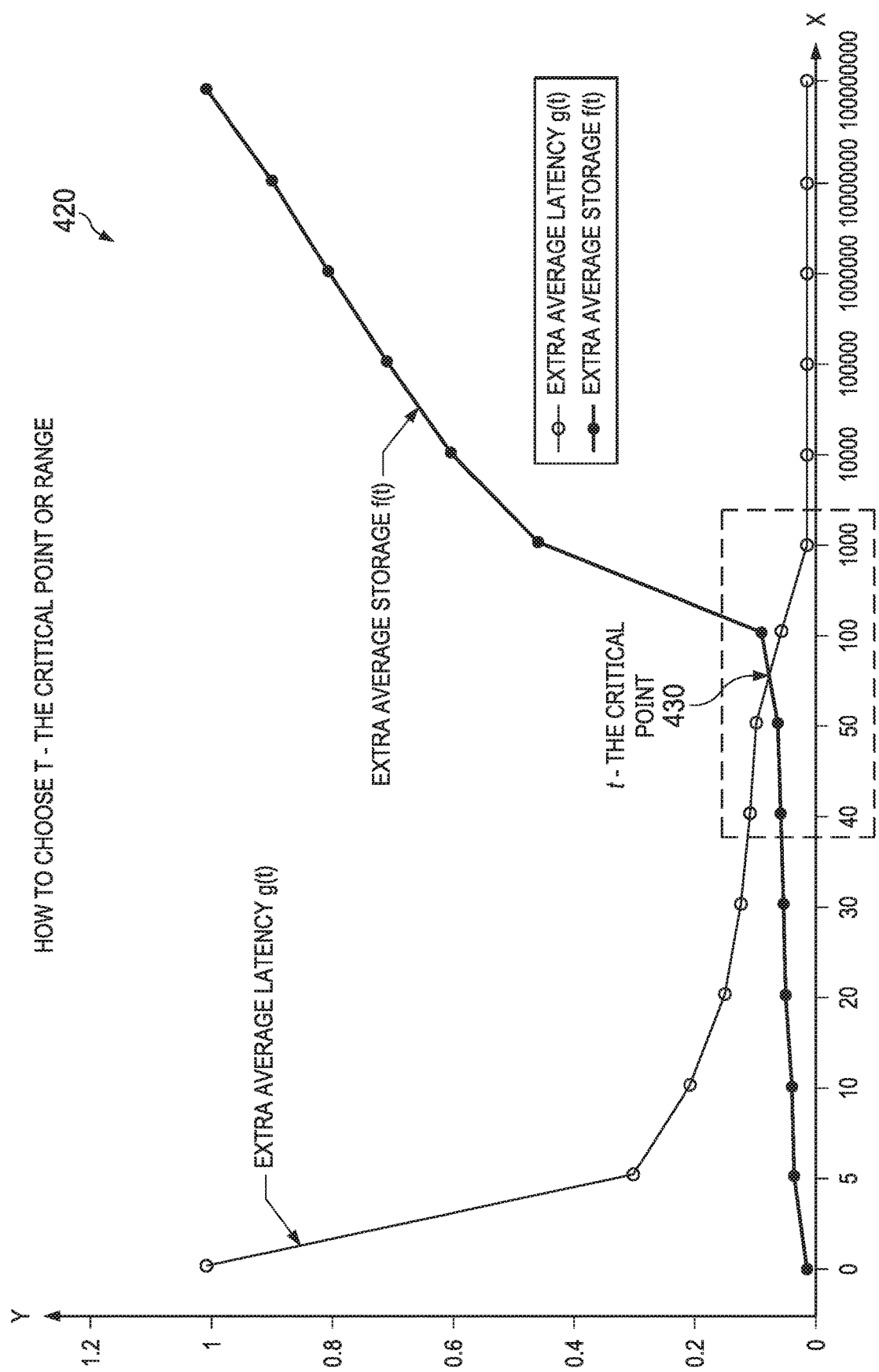

FIGS. 6-7 are graphs 410 and 420 that visually illustrate one method of calculating the critical point t. In more detail, the graph 410 in FIG. 6 is similar to the graph 400 in FIG. 5, but the location of the bars on the X-axis and their heights on the Y-axis are variables (e.g., D1, D2, D3, etc., and P1, P2, P3, etc.), rather than actual numbers taken from a concrete example. The graph 410 visually represents the distribution of the degrees of vertexes and the critical point t. For example, $D_i$ represents the $i_{th}$ ($1<=i<=n$) category of vertex degree range $[D_{ileft}, D_{iright})$. The value at the right-open interval $D_{iright}$ is used to represent the average degree of this category. $P_i$ represents the percentage of vertexes that belongs to the $D_i$ category, and t as discussed above represents the critical point, or the threshold that separates the high-degree vertexes (e.g., large accounts having large transaction volumes) and the low-degree vertexes (e.g., small accounts having small transaction volumes).

According to various aspects of the present disclosure, only the low-degree vertexes will be cached in the edges, since their caching does not significantly increase storage space of the edges, but it offers faster query speeds (e.g., one-hop query instead of two hops). As such, this storage scheme optimizes query speed (e.g., reduced latency) over storage space, since such an approach is more appropriate or suitable for the low-degree vertexes.

Meanwhile, the high-degree vertexes will not be cached in the edges but will instead be stored separately from the edges. This is because the high-degree vertexes have too many edges, and it will be wasteful to store the vertexes in all these edges. Two queries (e.g., two hops) are needed to retrieve the desired information: a first query to obtain the edges, and a second query to obtain the vertexes connected to the edges. As such, this storage scheme optimizes storage space efficiency over query speed (e.g., reduced latency), since such an approach is more appropriate or suitable for the high-degree vertexes.

In order to simultaneously optimize both query speed and storage space efficiency, a tradeoff between them is made, which is why the high-degree vertexes and the low-degree vertexes have different storage schemes. Thus, a unique aspect of the present disclosure involves determining the location of the critical point t, which enables the optimized classification of what is considered a high-degree vertex and what is considered a low-degree vertex. According to one embodiment, the critical point t corresponds to the intersection of two an extra average query latency function and an extra average storage function. This is illustrated in FIG. 7.

As shown in FIG. 7, the extra average query latency function g(t) is mathematically expressed as below:

$$g(t) = 0 \times \sum_{i=1}^{t} P_i + \sum_{i=t+1}^{n} P_i, 0 <= g(t) <= 1$$

Only high-degree vertexes require an extra query to retrieve their properties. Using an assumption that all vertexes have the same probability to be picked up in the query, g(t) equals to total percentage of all high-degree vertexes. The $$0 \times \sum_{i=1}^{t} P_i$$

term of g(t) indicates that no additional latency is caused by the vertexes to the "left" of t in the graphs 410 and 420, since it involves a multiplication by 0. The $$\sum_{i=t+1}^{n} P_i$$

term of g(t) indicates that additional latency is caused by vertexes to the "right" of t in the graphs 410 and 420.

The extra average storage function f(t) is mathematically expressed as below:

$$f(t) = \frac{\sum_{i=1}^{t} P_i \times D_{i_{right}} + 0 \times \sum_{i=t+1}^{n} P_i \times D_{i_{right}}}{\sum_{i=0}^{n} P_i \times D_{i_{right}}}, 0 <= f(t) <= 1$$

The sum of the degree of all low-degree vertexes is the extra storage needed for the entire graph (e.g., of FIG. 2). To normalize the range of f(t) between 0 to 1, the extra average storage equals the average degree of low-degree vertex/the average degree of all vertexes. The $$\sum_{i=1}^{t} P_i \times D_{i_{right}}$$

term of f(t) indicates that additional storage space is caused by the vertexes to the "left" of t in the graphs 410 and 420. The $$0 \times \sum_{i=t+1}^{n} P_i \times D_{i_{right}}$$

term indicates that no additional storage space is caused by the vertexes to the "right" of t in the graphs 410 and 420, since it involves a multiplication by 0.

Both g(t) and f(t) are plotted in the graph 420 as functions over vertex degree (e.g., account size). Note that the X-axis corresponding to the vertex size is on a logarithmic scale. It can be seen that the extra average latency g(t) is high when the vertex degree is low, and it drops as the vertex degree increases. On the other hand, the extra average storage f(t) is low when the vertex degree is low, and it rises as the vertex degree increases. These two curves g(t) and f(t) intersect at an intersection 430. This intersection represents the best balance between the query latency and extra storage space. Therefore, t has a vertex value corresponding to the intersection 430.

FIG. 8 illustrates a table 440 that lists the values of the degree of the various variables and functions discussed above with reference to FIG. 7. For example, the table 440 has five columns corresponding to the category $D_i$, the vertex count, the vertex percentage $P_i$, the extra average latency g(t), and the extra average storage f(t). As shown the table 440 of FIG. 8 and plotted in the graph 420 of FIG. 7, g(t) starts from 1 and drops down to 0 as the vertex degree increases from 0 to [10000000, MaxValue]. Meanwhile, f(t) starts from 0 and increases to 1 as the vertex degree increases from 0 to [10000000, MaxValue]. In this example, the value of the critical point t is around the vertex degree of between 50 and 100, for example around 75. In other words, accounts that have more than 75 transactions (vertex degree greater than 75) are considered a large account (or a high-degree vertex), and accounts that have fewer than 75 transactions (vertex degree less than 75) are considered a small account (or a low-degree vertex), in this example.

Figure 9:
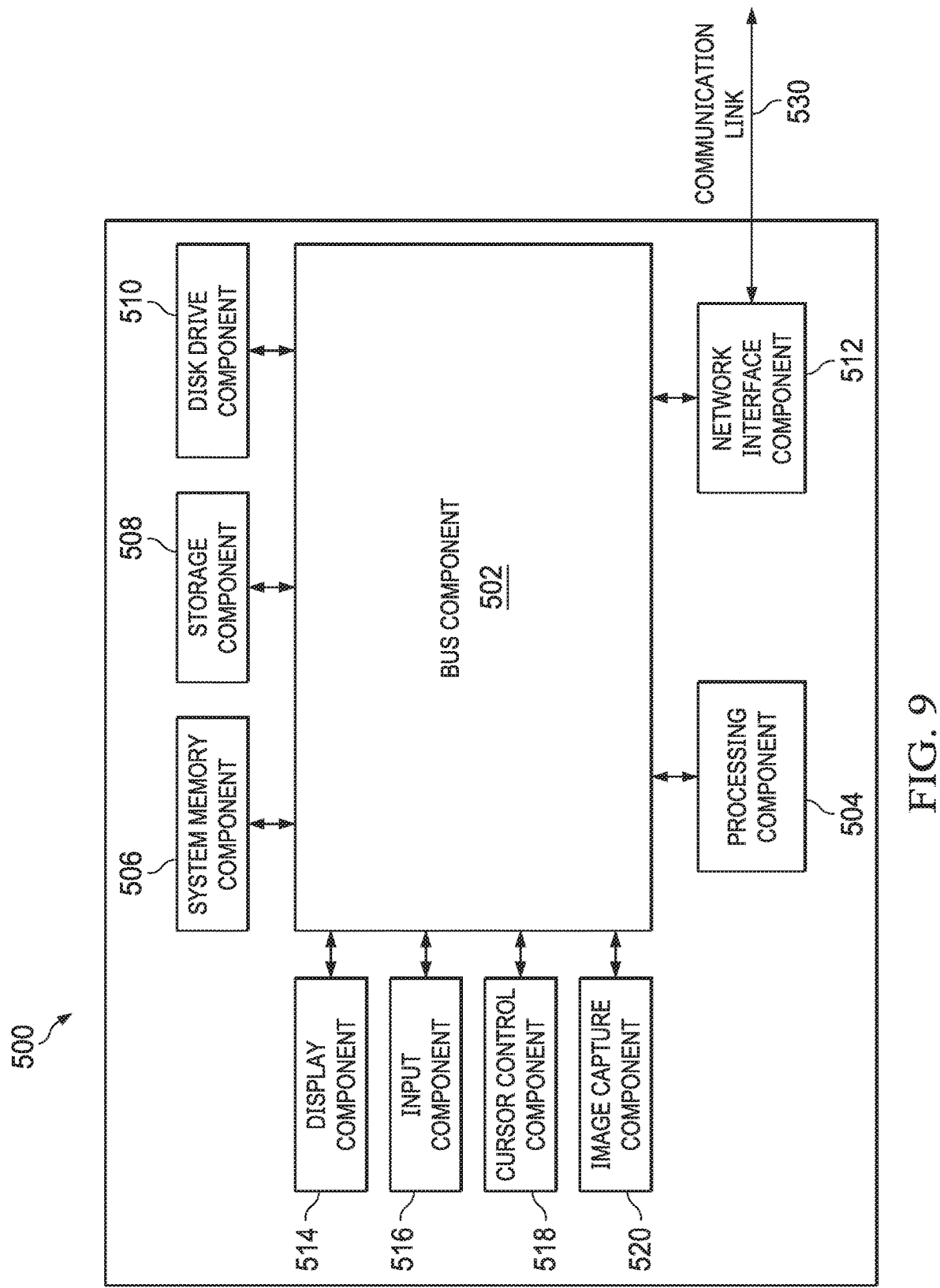
FIG. 9 is an example computer system according to various aspects of the present disclosure.

FIG. 9 is a block diagram of a computer system 500 suitable for implementing various methods and devices described herein, for example, the query speed and storage space optimization module 200, or the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the query speed and storage space optimization module 200 and the various method steps of the method 700 discussed below (or the user device 110, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the query speed and storage space optimization module 200 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the query speed and storage optimization module 200 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the query speed and storage space optimization module 200 and external devices, for example with the user device 110, with the merchant server 140, or with the payment provider server 170, depending on exactly where the query speed and storage space optimization module 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the query speed and storage space optimization module 200 may be implemented as such software code.

Figure 10:
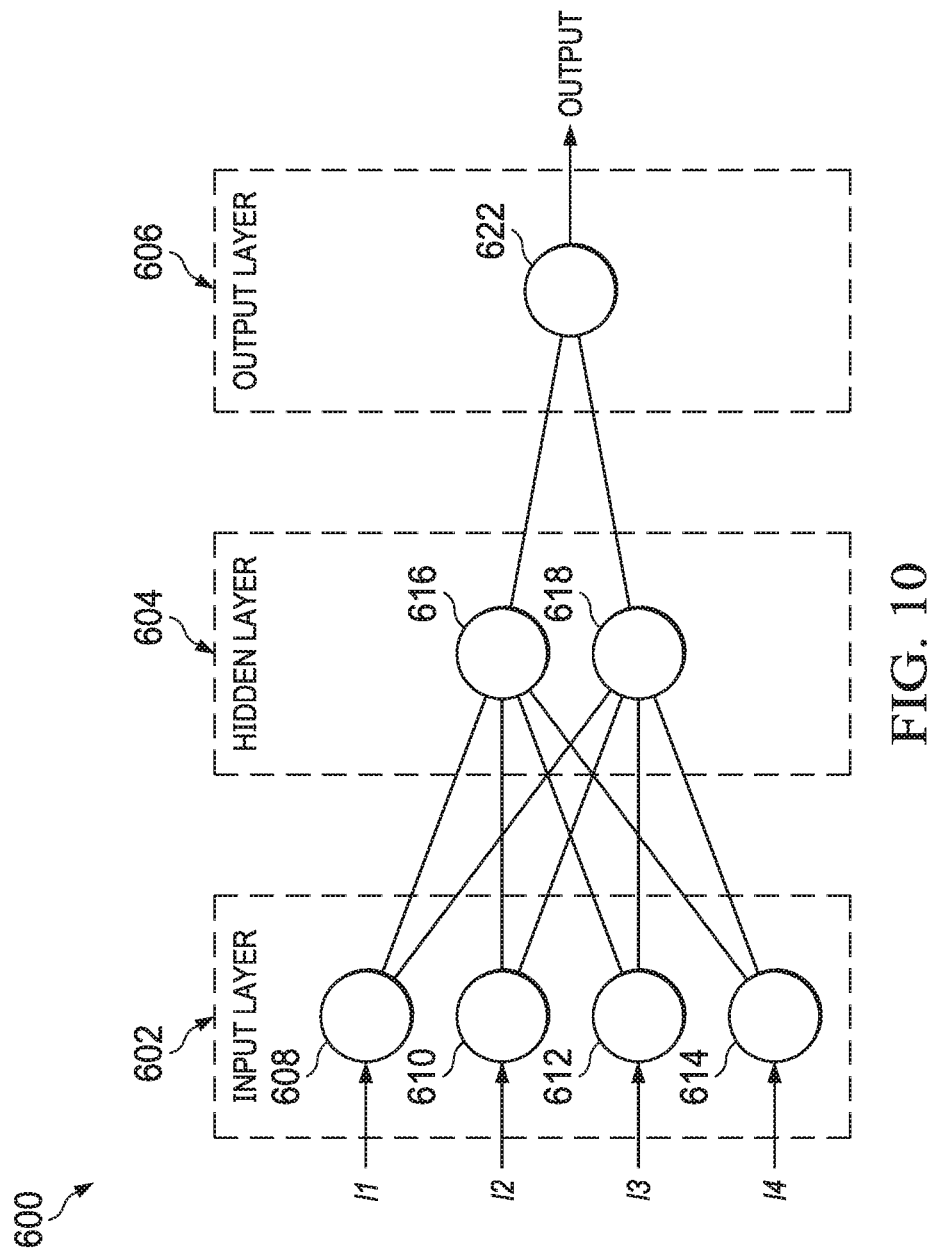
FIG. 10 illustrates an example artificial neural network according to various aspects of the present disclosure.

It is understood that machine learning may be used to refine the various aspects of the query speed and storage space optimization module 200. The machine learning may be performed at least in part via an artificial neural network. In that regard, FIG. 10 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the query speed and storage space optimization module 200, and the query speed and storage space optimization module 200 may include as many hidden layers as necessary.

In this example, the artificial neural network 600 receives a set of input values and produces an output value. Each node in the input layer 602 may correspond to a distinct input value. For example, when the artificial neural network 600 is used to implement the query speed and storage space optimization module 200, each node in the input layer 602 may correspond to a distinct attribute of a transaction.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the query speed and storage space optimization module 200, the output value produced by the artificial neural network 600 may indicate a likelihood of an event (e.g., a dispute event, a chargeback event, etc.) associated with the transaction.

The artificial neural network 600 may be trained by using training data. By providing training data to the artificial neural network 600, the nodes 616-618 in the hidden layer 604 may be trained (adjusted) such that an optimal output (e.g., determining a value for a threshold) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 11:
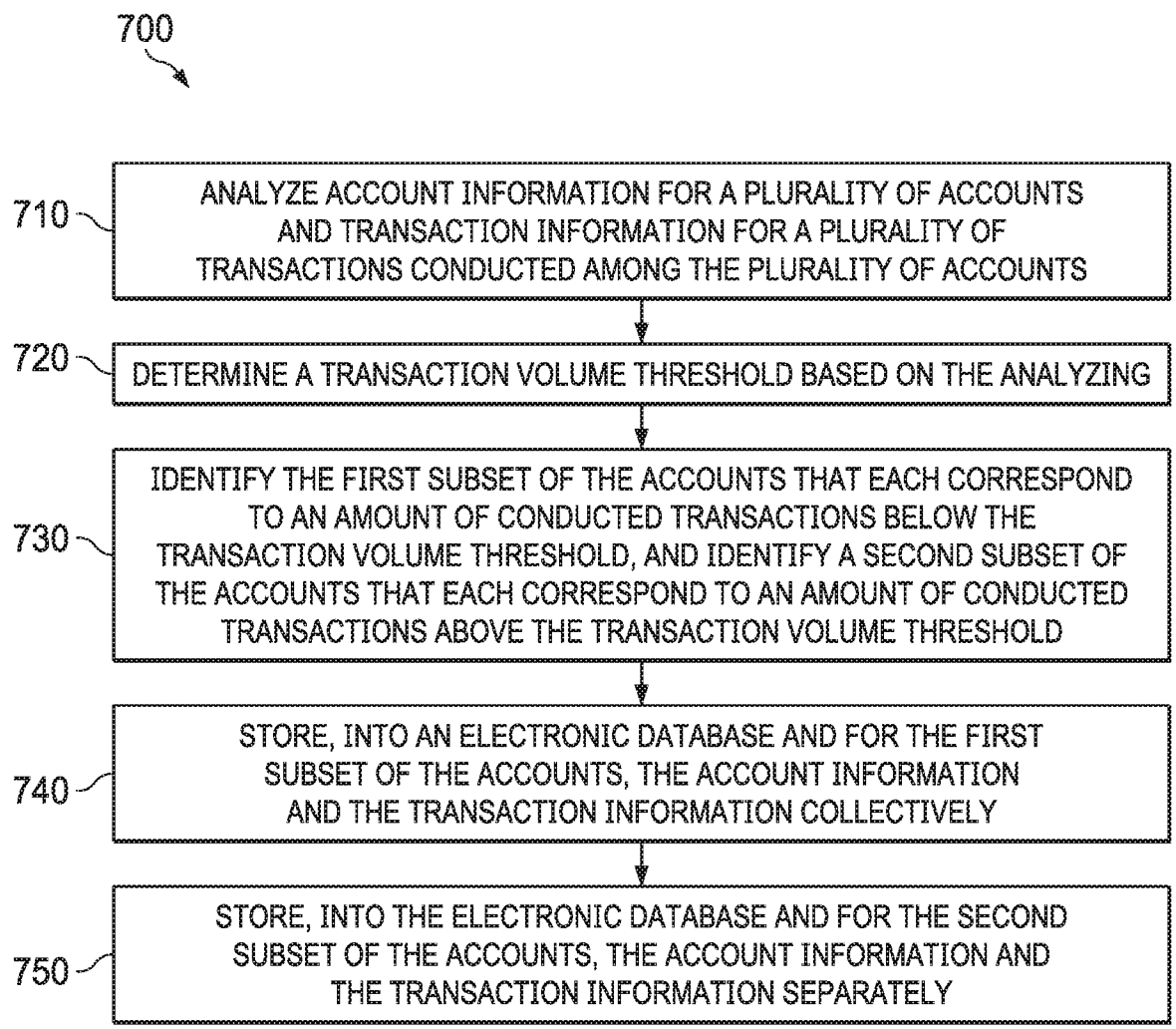
FIG. 11 is a flowchart illustrating a method of storing information into an electronic database according to various aspects of the present disclosure.
Figure 12:
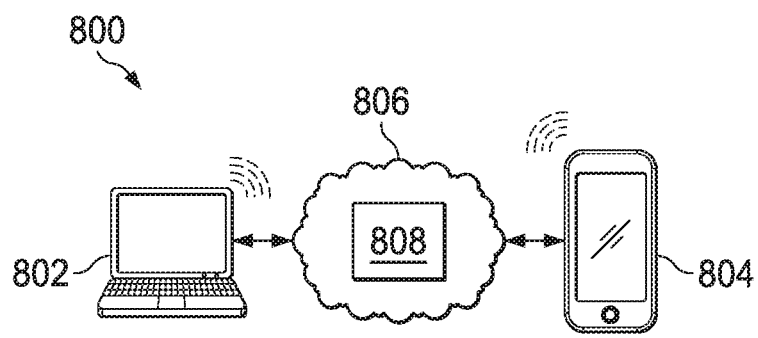
FIG. 12 is a simplified example of a cloud-based computing architecture according to various aspects of the present disclosure.

FIG. 11 is a flowchart illustrating a method 700 for storing information in an electronic database according to various aspects of the present disclosure. The various steps of the method 700 may be performed by one or more electronic processors. In some embodiments, at least some of the steps of the method 700 may be performed by the query speed and storage space optimization module 200 discussed above.

The method 700 includes a step 710 to analyze account information for a plurality of accounts and transaction information for a plurality of transactions conducted among the plurality of accounts. In some embodiments, the accounts include accounts of a payment provider.

The method 700 includes a step 720 to determine a transaction volume threshold based on the analysis of step 710.

The method 700 includes a step 730 to identify a first subset of the accounts that each corresponds to an amount of conducted transactions below the transaction volume threshold, and to identify a second subset of the accounts that each corresponds to an amount of conducted transactions above the transaction volume threshold.

The method 700 includes a step 740 to store, into an electronic database and for the first subset of the accounts, the account information and the transaction information collectively.

The method 700 includes a step 750 to store, into the electronic database and for the second subset of the accounts, the account information and the transaction information separately. It is understood that both the steps 740 and 750 may be performed in response to the identification in step 730.

In some embodiments, the step 740 comprises: a step to locate a second account involved in a first transaction conducted by a first account in the first subset; and a step to generate a first electronic database entry for the first transaction. The first electronic database entry stores transaction information of the first transaction and account information of at least the first account or the second account. In some embodiments, the step to generate the first electronic database entry comprises a step to store, with the transaction information, the account information of both the first account and the second account. In some embodiments, the step to store the account information and the transaction information collectively comprises: a step of repeating the locating and the generating for a rest of the transactions conducted by accounts in the first subset.

In some embodiments, the step to store the account information and the transaction information separately comprises: a step to locate a second account involved in a first transaction conducted by a first account in the second subset; a step to generate a first electronic database entry that stores transaction information of the first transaction; and a step to generate a second electronic database entry that stores account information of the first account and the second account. The first electronic database entry and the second electronic database entry are stored separately in the electronic database.

In some embodiments, the step 720 comprises: a step to construct a first plot of latency versus transaction volume; a step to construct a second plot of storage space versus transaction volume; and a step to determine an intersection of the first plot and the second plot. The transaction volume corresponding to the intersection is the transaction volume threshold.

It is understood that additional method steps may be performed before, during, or after the steps 710-750 discussed above. For example, the method 700 may include a step to generate a graph that includes a plurality of vertexes and a plurality of edges that interconnect the vertexes. Each of the vertexes corresponds to account information of a respective one of the accounts. Each of the edges corresponds to transactions information of a respective one of the transactions. In some embodiments, the method 700 further includes a step of using the graph to investigate suspicious activities associated with one of the accounts or one of the transactions. For reasons of simplicity, other additional steps are not discussed in detail herein.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, by using the query speed and storage space optimization module 200 to determine the threshold between high-degree and low-degree vertexes and store information differently for the high-degree and low-degree vertexes, the electronic database may be able to store data more efficiently compared to conventional databases. Therefore, the present disclosure improves electronic memory storage efficiency. In addition, by storing information differently for the high-degree and low-degree vertexes, the present also improves query speed or reduces latency of queries. As such, the present disclosure effectively increases the speed in computer operations. The inventive ideas of the present disclosure are also integrated into a practical application, for example into the query speed and storage space optimization module 200, such that it may be used to facilitate investigations into suspicious activities in a real world payment provider or another suitable platform through which transactions are conducted.

FIG. 8 illustrates an example cloud-based computing architecture 800, which may also be used to implement various aspects of the present disclosure. The cloud-based computing architecture 800 includes a mobile device 804 (e.g., the user device 110 of FIG. 1) and a computer 802 (e.g., the merchant server 140 or the payment provider server 170), both connected to a computer network 806 (e.g., the Internet or an intranet). In one example, a consumer has the mobile device 804 that is in communication with cloud-based resources 808, which may include one or more computers, such as server computers, with adequate memory resources to handle requests from a variety of users. A given embodiment may divide up the functionality between the mobile device 804 and the cloud-based resources 808 in any appropriate manner. For example, an app on mobile device 804 may perform basic input/output interactions with the user, but a majority of the processing may be performed by the cloud-based resources 808. However, other divisions of responsibility are also possible in various embodiments. In some embodiments, using this cloud architecture, the query speed and storage space optimization module 200 may reside on the merchant server 140 or the payment provider server 170, but its functionalities can be accessed or utilized by the mobile device 804, or vice versa.

The cloud-based computing architecture 800 also includes the personal computer 802 in communication with the cloud-based resources 808. In one example, a participating merchant or consumer/user may access information from the cloud-based resources 808 by logging on to a merchant account or a user account at computer 802. The system and method for determining the threshold between high-degree and low-degree vertexes and applying different storage schemes for them as discussed above may be implemented at least in part based on the cloud-based computing architecture 800.

It is understood that the various components of cloud-based computing architecture 800 are shown as examples only. For instance, a given user may access the cloud-based resources 808 by a number of devices, not all of the devices being mobile devices. Similarly, a merchant or another user may access the cloud-based resources 808 from any number of suitable mobile or non-mobile devices. Furthermore, the cloud-based resources 808 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: analyzing account information for a plurality of accounts and transaction information for a plurality of transactions conducted among the plurality of accounts; determining a transaction volume threshold based on the analyzing; identifying a first subset of the accounts that each corresponds to an amount of conducted transactions below the transaction volume threshold, and identifying a second subset of the accounts that each corresponds to an amount of conducted transactions above the transaction volume threshold; and in response to the identifying: storing, into an electronic database and for the first subset of the accounts, the account information and the transaction information collectively; and storing, into the electronic database and for the second subset of the accounts, the account information and the transaction information separately.

Another aspect of the present disclosure involves a system that includes a non-transitory memory and one or more hardware processors coupled to the non-transitory memory and configured to read instructions from the non-transitory memory to cause the system to perform operations comprising: analyzing account information for a plurality of accounts and transaction information for a plurality of transactions conducted among the plurality of accounts; determining, based on the analyzing, a first function of latency and account sizes of the accounts; determining, based on the analyzing, a second function of electronic storage space and the account sizes of the accounts; determining an account size threshold based on the first function and the second function; and in response to the determining the account size: storing, into an electronic database and for accounts having an account size smaller than the account size threshold, the account information and the transaction information together; and storing, into the electronic database and for accounts having an account size larger than the account size threshold, the account information and the transaction information separately.

Yet another aspect of the present disclosure involves a non-transitory machine-readable medium having stored thereon machine-readable instructions executable to cause a machine to perform operations comprising: accessing account information for a plurality of accounts and transaction information for a plurality of transactions conducted among the plurality of accounts; determining, based on the accessing, a threshold that separates large accounts of the accounts above the threshold from small accounts of the accounts below the threshold; storing, for the large accounts, the transaction information and the account information according to a first database storage scheme that prioritizes an efficiency in a storage space over a query speed; and storing, for the small accounts, the transaction information and the account information according to a second database storage scheme that prioritizes the query speed over the efficiency in the storage space.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   analyzing account information for a plurality of accounts and transaction information for a plurality of transactions conducted among the plurality of accounts;
   determining a transaction volume threshold based on the analyzing;
   identifying a first subset of the accounts that each corresponds to an amount of conducted transactions below the transaction volume threshold;

identifying a second subset of the accounts that each corresponds to an amount of conducted transactions above the transaction volume threshold; and based on the identifying the first subset and the second subset:

storing, into an electronic database and for the first subset of the accounts, the account information and the transaction information collectively; and storing, into the electronic database and for the second subset of the accounts, the account information and the transaction information separately, wherein the storing the account information and the transaction information separately comprises:

locating a second account involved in a first transaction conducted by a first account in the second subset;

generating a first electronic database entry that stores transaction information of the first transaction; and generating a second electronic database entry that stores account information of the first account and the second account, wherein the first electronic database entry and the second electronic database entry are stored separately in the electronic database.

2. The method of claim 1, further comprising: generating a graph that includes a plurality of vertexes and a plurality of edges that interconnect the vertexes;

wherein:

each of the vertexes corresponds to account information of a respective one of the accounts; and each of the edges corresponds to transactions information of a respective one of the transactions.

3. The method of claim 2, further comprising: determining suspicious activities associated with one of the accounts or one of the transactions using the graph.

4. The method of claim 1, wherein the storing the account information and the transaction information collectively comprises:

locating a second account involved in a first transaction conducted by a first account in the first subset; and generating a first electronic database entry for the first transaction, the first electronic database entry storing transaction information of the first transaction and account information of at least the first account or the second account.

5. The method of claim 4, wherein the generating the first electronic database entry comprises storing, with the transaction information, the account information of both the first account and the second account.

6. The method of claim 4, wherein the storing the account information and the transaction information collectively comprises: repeating the locating and the generating for a rest of the transactions conducted by accounts in the first subset.

7. The method of claim 1, wherein the determining a transaction volume threshold comprises:

constructing a first plot of latency versus transaction volume;

constructing a second plot of storage space versus transaction volume; and determining an intersection of the first plot and the second plot, wherein the transaction volume corresponding to the intersection is the transaction volume threshold.

8. The method of claim 1, wherein the accounts include accounts of a payment provider.

9. The method of claim 1, wherein the analyzing, the determining, the identifying the first subset and the second subset, the storing the account information and the transaction information collectively, and the storing the account information and the transaction information separately are performed via one or more hardware electronic processors.

10. The method of claim 1, wherein:

the account information comprises an account password, a payment instrument, a name, an address, a citizenship, an employer, or a user preference; and the transaction information comprises a monetary amount of a transaction or a date of a transaction.

11. A system, comprising:

a non-transitory memory; and one or more hardware processors coupled to the non-transitory memory and configured to read instructions from the non-transitory memory to cause the system to perform operations comprising:

analyzing account information for a plurality of accounts and transaction information for a plurality of transactions conducted among the plurality of accounts;

determining, based on the analyzing, a first function of latencies and account sizes of the accounts;

determining, based on the analyzing, a second function of electronic storage space and the account sizes of the accounts;

determining an account size threshold based on the first function and the second function; and based on the determining the account size threshold:

storing, into an electronic database and for accounts having an account size smaller than the account size threshold, the account information and the transaction information together; and storing, into the electronic database and for accounts having an account size larger than the account size threshold, the account information and the transaction information separately, wherein the storing the account information and the transaction information separately comprises:

generating a first database record to store at least some of the transaction information; and generating a second database record to store at least some of the account information.

12. The system of claim 11, wherein the operations further comprise:

representing the account information with a plurality of vertexes in a graph; and representing the transaction information with a plurality of edges that interconnect the vertexes in the graph.

13. The system of claim 12, wherein the operations further comprise investigating, using the graph, suspicious accounts or suspicious transactions.

14. The system of claim 11, wherein the determining the account size threshold comprises determining that an intersection of the first function and the second function corresponds to the account size threshold.

15. The system of claim 11, wherein the storing the account information and the transaction information together comprises generating a database record to store at least some of the transaction information and caching at least some of the account information in the database record.

16. The system of claim 11, wherein:

the account information comprises an account password, a payment instrument, a name, an address, a citizenship, an employer, or a user preference; and the transaction information comprises a monetary amount of a transaction or a date of a transaction.

17. A non-transitory machine-readable medium having stored thereon machine-readable instructions executable to cause a machine to perform operations comprising:

accessing account information for a plurality of accounts and transaction information for a plurality of transactions conducted among the plurality of accounts;

determining, based on the accessing, a threshold that separates a first type of account of the accounts above the threshold from a second type of account of the accounts below the threshold;

storing, for the first type of account, the transaction information and the account information according to a first database storage scheme that prioritizes an efficiency in a storage space over a query speed, the first data storage scheme storing the transaction information and the account information in separate database records; and storing, for the second type of account, the transaction information and the account information according to a second database storage scheme that prioritizes the query speed over the efficiency in the storage space, the second data storage scheme storing the transaction information and the account information in a same database record.

18. The non-transitory machine-readable medium of claim 17, wherein the operations further comprise generating a graph containing vertexes and edges that interconnect the vertexes, wherein the vertexes have the account information stored therein, and wherein the edges have the transaction information stored therein.

19. The non-transitory machine-readable medium of claim 17, wherein the determining the threshold comprises:

generating a first plot of the query speed versus an account size of the accounts;

generating a second plot of the storage space versus the account size; and determining that an intersection of the first plot and the second plot corresponds to the threshold.

20. The non-transitory machine-readable medium of claim 17, wherein:

the account information comprises an account password, a payment instrument, a name, an address, a citizenship, an employer, or a user preference; and the transaction information comprises a monetary amount of a transaction or a date of a transaction.

* * * * *